UNITED STATES PATENT OFFICE.

DANIEL A. SHESLER, OF TOLEDO, OHIO.

CARBON FOR ARC-LAMPS.

SPECIFICATION forming part of Letters Patent No. 570,825, dated November 3, 1896.

Application filed February 13, 1896. Serial No. 579,169. (No model.)

*To all whom it may concern:*

Be it known that I, DANIEL A. SHESLER, a citizen of the United States, residing at Toledo, in the county of Lucas and State of Ohio, have invented certain new and useful Improvements in Carbons for Arc-Lamps; and I do declare the following to be a full, clear, and exact description of the invention, such as will enable others skilled in the art to which it appertains to make and use the same.

My invention has relation to improvements in composition carbons for electric-arc lights; and the object is to produce a carbon pencil for the purposes named which will have increased durability and, in enlarged proportions, possess the essential characteristics of affording complete illumination at increased separation of the carbon points.

My improved carbons are made of graphitoid silicon, asbestos, and a carbonaceous ingredient, such as pulverized coke or retort-carbon.

To make the carbons, I take of graphitoid silicon about thirty parts, asbestos about sixteen parts, and of the carbon ingredients about fifty parts, and a binder, preferably Trinidad asphalt, to make up the balance of the one hundred parts.

The graphitoid silicon is prepared and produced by heating amorphous silicon in an inclosed platinum crucible and subjected to heat until it is no longer liable to reduction or fusion by any known caloric effect. After being so subjected to the heating process and cooled it is ground up as fine as desired or essential. It is then mixed with finely-ground asbestos and the carbon similarly ground, and then the asphaltic binder is added and the whole thoroughly mixed, and then the composition so prepared is placed in suitably-heated molds, and after compression in the molds the carbons are removed and subjected to heat in a kiln until thoroughly indurated and the inflammable and destructible binding ingredient has been completely eliminated, when they are removed and allowed to cool, and they are then ready for use.

By actual experiment I have ascertained that a carbon made of the ingredients specified and by the mode described will last much longer than the present carbons in use and that they will operate in producing illumination without loss of intensity or brilliancy with their points separated farther than present carbons, and even maintaining the requisite light at a distance of separation beyond where the light ceases in the ordinary carbons now used in arc-lights.

Having thus described my invention, what I claim, and desire to secure by Letters Patent, is—

A composition for carbons for electric-arc lights, consisting of graphitoid silicon, asbestos, carbon, and a binder, in the proportions and prepared substantially as set forth.

In testimony whereof I hereunto affix my signature in presence of two witnesses.

DANIEL A. SHESLER.

Witnesses:
FLORENCE THOMAS,
A. B. SUIT.